United States Patent [19]
Jones et al.

[11] Patent Number: 6,074,551
[45] Date of Patent: Jun. 13, 2000

[54] AUTOMATIC CLEANING SYSTEM FOR A REVERSE OSMOSIS UNIT IN A HIGH PURITY WATER TREATMENT SYSTEM

[75] Inventors: Larry T. Jones, Danbury; Barry R. Mix, New Milford, both of Conn.

[73] Assignee: Culligan Water Conditioning of Fairfield County, South Windsor, Conn.

[21] Appl. No.: 09/069,965

[22] Filed: Apr. 30, 1998

[51] Int. Cl.[7] .............................. B01D 61/12; B01D 61/10; B01D 65/08

[52] U.S. Cl. ............................ 210/106; 210/110; 210/134; 210/137; 210/195.2; 210/198.1; 210/321.69

[58] Field of Search ......................... 210/96.2, 106.109, 210/110, 137, 195.2, 248, 257.2, 258, 259, 321.69, 636, 637, 134, 192, 196, 198.1

[56] References Cited

U.S. PATENT DOCUMENTS

| | | | |
|---|---|---|---|
| 3,992,301 | 11/1976 | Shippey et al. | 210/321.69 |
| 4,629,568 | 12/1986 | Ellis, III | 210/636 |
| 4,773,993 | 9/1988 | Yoda et al. | 210/136 |
| 4,784,763 | 11/1988 | Hambleton et al. | 210/195.2 |
| 4,784,771 | 11/1988 | Wathen et al. | 210/636 |
| 4,921,610 | 5/1990 | Ford et al. | 210/636 |
| 5,017,284 | 5/1991 | Miler et al. | 210/321.69 |
| 5,401,395 | 3/1995 | Hagqvist et al. | 210/321.69 |
| 5,520,816 | 5/1996 | Kuepper | 210/195.2 |
| 5,647,973 | 7/1997 | Desaulniers | 210/96.2 |

*Primary Examiner*—Joseph W. Drodge
*Attorney, Agent, or Firm*—Wolf, Greenfield & Sacks, P.C.

[57] ABSTRACT

A self contained water purification process system uses a self cleaning, self sanitizing reverse osmosis unit for reliably producing purified water, storing the water, and distributing it to a central supply piping system while maintaining the integrity of the purified water. Make-up water is prepared for reverse osmosis purification by means of staged conventional filtration and chlorine removal. The prepared make-up water is then fed into one or more reverse osmosis modules by a pump at a high velocity and pressure. About 85 percent of the make-up water exits the module as purified water. All of the water not passing through the reverse osmosis membranes returns to the suction end of the pump where it blends with incoming make-up water except for a small portion that is discharged to a waste drain. The high velocity flow maintains a shear effect within the modules to prevent a sediment deposition and biofilm from occurring on the membranes and increases the efficiency of water usage. During an automatic unattended cleaning sanitizing cycle, the recycled water is diverted through an injector which draws cleaning chemical into the stream.

19 Claims, 4 Drawing Sheets

AUTOMATIC CLEANING SYSTEM FOR A REVERSE OSMOSIS UNIT IN A HIGH PURITY WATER TREATMENT SYSTEM

This invention relates generally to water treatment systems and more particularly to a high purity, reverse osmosis water treatment system with automatic cleaning and sanitizing of the reverse osmosis unit.

BACKGROUND OF THE INVENTION

There are professional and government agencies which publish standards for "purified water" for Good Manufacturing Practices (GMP) for commercial laboratories, universities, hospitals, pharmaceutical companies or electronics manufacturers. Thus the term "purified water" has different definitions, depending on which group or agencies' standards are being followed.

The common denominator within the standards is the requirement that the process used to treat and distribute the water must consistently deliver water that meets the standards required by the end users. Commercial laboratory, GMP, or pharmaceutical water purifying systems have strategically positioned water sampling valves and water quality analytical instruments that are used to monitor the systems' performance and the water purity at various stages of processing, and at the use points.

Reverse osmosis water treatment systems are standard primary treatments of choice because of their capability to reduce dissolved salts by as much as 99.5 percent and to reduce suspended matter and microorganisms by over 99.5 percent. If a standard requires only moderate levels of purity, reverse osmosis with properly treated make-up feed water may suffice. If a standard requires higher levels of purities, additional treatment can be employed, such as a second RO in series with the first one (double pass), deionizing resins, and ultraviolet treatment, for example. Purified water must be stored and distributed through piping, tanks, pumps, and fittings that do not contaminate it. Entire storage and distribution systems must be compatible with various harsh cleaning chemicals, sanitizing agents or with water temperatures of up to 90° C. (194° F.), if heat is employed to sanitize them.

A reverse osmosis module known to the art consists of a semi-permeable membrane within a pressure vessel that allows some water to pass through the membrane when the water pressure is at a controlled point. As some of the water passes through the membrane, the suspended matter, microorganisms, and dissolved solids in the remaining water increase (concentrate). As they increase, some may settle or precipitate on the surface of the membrane, forming a deposit that can reduce the flow and the rated performance of the module.

During the off cycles when the make-up water and the pump are shut off; the concentrated material that has deposited during the operating cycles can solidify and it can form a scale. Bacteria proliferate during static periods and they colonize on the downstream surface of the membranes. By the process of osmosis, dissolved salts pass through the membranes thus contaminating the permeate side whenever a conventional system is in off-cycle modes.

When the operating flux (flow) through a module decreases by 10 to 15 percent, or if the rejection of dissolved solids drops by 10 percent, the module must be chemically cleaned with combinations of approved alkali and then by acid solutions and rinsed until the rated performance is restored. When microorganisms form colonies within the modules and contaminate the purified water, the modules must be cleaned and then sanitized with an agent or agents approved by the module manufacturer. The downtime is considerable. Replacing the fouled membranes is sometimes necessary, when getting the system operational is essential to the users of the purified water and insufficient time is available for cleaning and sanitizing.

Cleaning and sanitizing RO modules requires shutting down the water purifying process for several hours or days, which adversely impacts on those who require purified water for their activities. Therefore, the procedure is often times postponed for convenience, thus causing the contamination problems to increase and the performance standard to decrease beyond membrane manufacturers' recommendations. If the purified water has contamination levels that exceed the users' specifications or recommended levels, the water may not be used for manufacturing until the purity is restored and has passed analytical tests which may require several days to perform. Microbiological problems within RO purified water systems are universally known of and acknowledged in laboratory and GMP manufacturing industries because the published standards, in order to be obtained, require that microbiological tests of the purified water be performed and recorded. They clearly show that frequent cleaning and sanitizing is required in order to comply with standard specifications.

To remedy some of the design deficiencies of standard reverse osmosis water treatment systems, various attempts and inventions have been made. Some of the water treatment systems are disclosed in the following patents, which are not intended to be all-inclusive but only exemplary of the prior art.

| U.S. Pat. No. | Date | Title |
|---|---|---|
| 4,629,568 | Dec. 16, 1986 | Fluid Treatment System |
| 4,773,993 | Sep. 27, 1988 | Apparatus for Purifying and Dispensing Water with Stagnation Preventing Means |
| 4,784,771 | Nov. 15, 1988 | Method and Apparatus for Purifying Fluids |
| 5,647,973 | Jul. 15, 1997 | Reverse Osmosis Filtration System with Concentrate Recycling Controlled by Upstream Conductivity |

An automatic cleaning system for a filter is shown in the following U.S. Pat. No. : 4,921,610 May 1, 1990 Cleaning of Hollow Fibre Filters Accordingly one object of the invention is to provide an improved cleaning and sanitizing system for a reverse osmosis water purification system which operates automatically and unattended.

SUMMARY OF THE INVENTION

Briefly stated, the invention comprises an improved water purification system of the type including a reverse osmosis (RO) unit having one or more RO modules, a source of make-up water which has been prepared by filtering and oxidants removal, a make-up water supply conduit connected to the make-up water source, a pump having an inlet side connected to the make-up water supply conduit and an outlet side connected to a concentrate side of the RO membrane, a permeate line connected to the permeate side of the RO membrane for conducting purified water from the RO unit, a storage tank connected to receive purified water from the permeate line, a concentrate line connected to the concentrate side of the RO membrane for conducting concentrate from the RO unit, a recycling line connected to supply a portion of concentrate from the condensate line to join with the source of make-up water on the inlet side of the pump, and a reject line connected to conduct another portion of the concentrate from the concentrate line to drain.

The improvement comprises an automatic cleaning system having (1) means regulating the flow rate through the recycling line relative to the flow rate through the drain line, such that the recycled concentrate flow rate significantly exceeds the permeate flow rate so as to scour the semipermeable membrane with a high velocity flow of concentrate during a purification cycle, (2) a chemical injection system including a chemical injection conduit for conducting concentrate from the concentrate line to the inlet side of the pump, a source of chemical for cleaning the membrane and an injector connected to inject a controlled flow of chemical into the chemical injection conduit during a chemical injection cycle, (3) a purge conduit connected to supply purified water from the storage tank to the inlet side of the pump during a purge cycle and during the chemical injection cycle, (4) a flush conduit connected to dump concentrate from the concentrate line to drain during a purge cycle during the chemical injection cycle, (5) a plurality of controllable valves arranged to selectively control the flow through said conduits, and (6) a programmable logic controller connected to selectively control said valves to provide at least the purification cycle, the purge cycle, and the chemical injection cycle.

DRAWING

FIG. 3 is a plan illustrating the connections between FIG. 1 and FIG. 2, and.

DESCRIPTION OF THE PREFERRED EMBODIMENT

Figure 1:
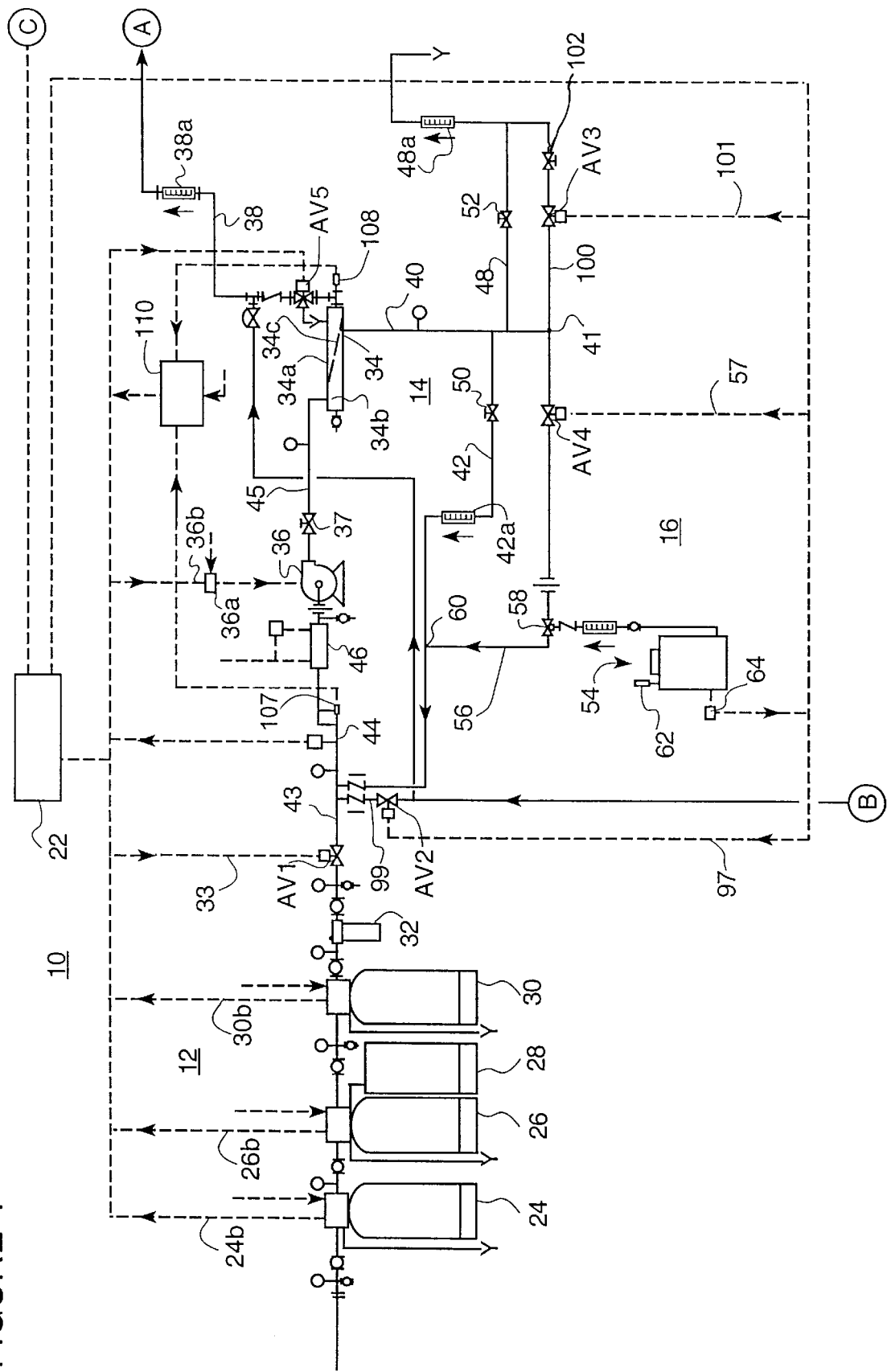
FIG. 1 is a schematic drawing of one portion of a reverse osmosis water purification system.
Figure 2:
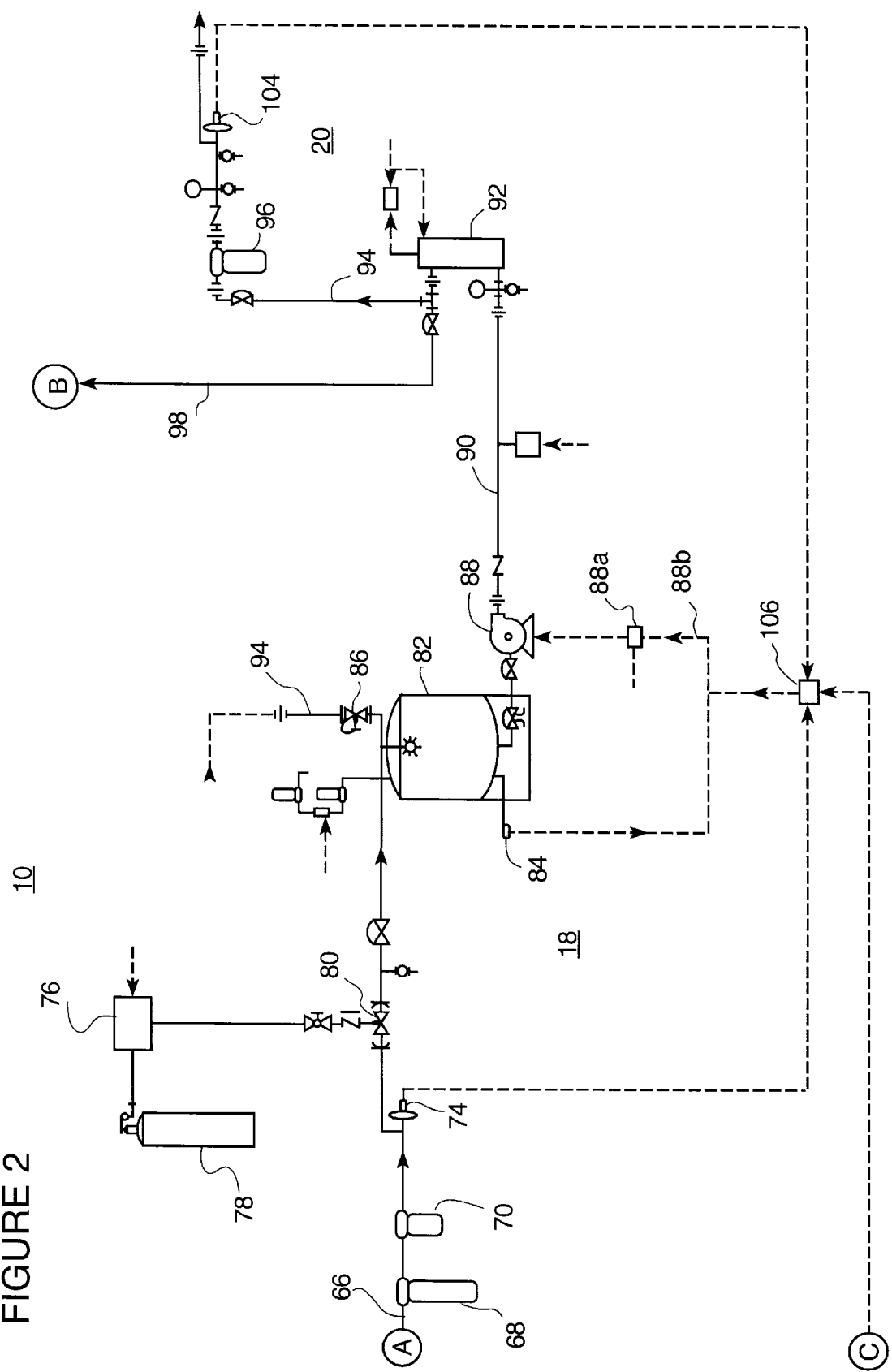
FIG. 2 is a schematic drawing of the remainder of the system.
Figure 3:
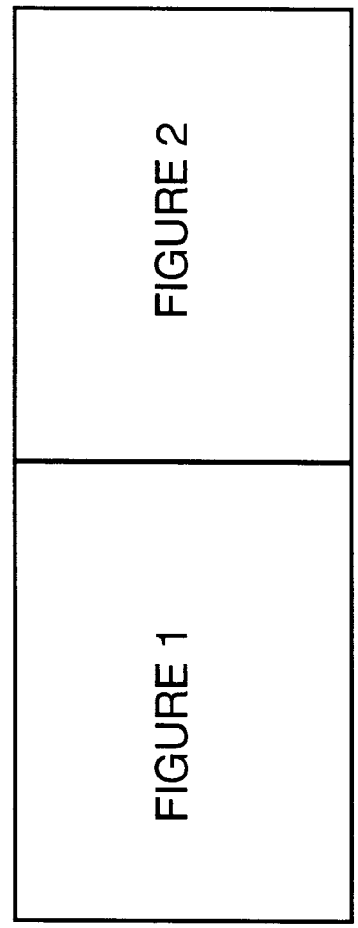

Referring to FIGS. 1 and 2 of the drawing, a reverse osmosis water purification system is shown which processes raw make-up water entering the system at the left hand side of FIG. 1 and which exits on the right hand end of FIG. 2 as "purified water" suitable for use by commercial laboratories, universities, hospitals, pharmaceutical companies or electronics manufacturers or for meeting the standards for U.S.P. purified water per the United States Pharmacopeia.

The water purification system, shown generally at 10, is broken down into general sections indicated as a make-up water preparation section 12, a reverse osmosis section 14 with concentrate recirculation loop, a chemical injection section 16, and, in FIG. 2, a filtering and purified water storage section 18, and a UV sterilized loop supply section 20. The system is under the control of a programmable logic controller 22 which receives input signals from the various system monitors and sensors, and which supplies output or control signals to the various pumps and valves as indicated by the dashed lines in the drawing.

Referring now to the make-up water pretreatment section 12, which is conventional and known in the art, staged filters comprising a deep bed filter 24, resin softener 26 with brine tank 28 and a carbon filter 30 have programmable backwash control units 24a, 26a, 30a and are monitored by the programmable logic controller 22 via sensor lines 24b, 26b, 30b. A one-micron filter 32 serves to complete the make-up water pretreatment section, which then supplies prepared make-up water to the reverse osmosis section 14 by means of a controllable make-up water supply valve AV1. Valve AV1 is operated under control of the programmable logic controller by means of control line 33, to discharge prepared make-up water into a make-up supply conduit 44.

The reverse osmosis section 14, which is the heart of the purification system, is based upon a reverse osmosis (RO) unit 34. The reverse osmosis unit incorporates a known type of spiral wound, low pressure thin film composite reverse osmosis module, specifically described in the manufacturer's literature as: Dow Chemical FT3O, Hydranautics LHA2PA2, or TriSep ACM2-TST, among others. The reverse osmosis module does not in and of itself become a part of this invention. One module known to the art is the TriSep ACM2-TST which is available in standard sizes to fit standard vessels commonly called module pressure vessels. RO unit 34 is supplied by an RO pump 36 operated through a switch 36a controlled by the programmable logic controller (PLC) via control line 36b.

The configuration of the RO membrane may vary, but it may be considered for the purpose of analysis as a single semi-permeable membrane 34a having a concentrate chamber 34b on its concentrate side and a permeate chamber 34c on its permeate side. The outlet of pump 36 is connected to the concentrate side of the RO membrane via a manually adjustable valve 37.

Water passing through the membrane 34a is conducted from the permeate side from the RO unit by a permeate line 38. Water that does not pass through the membrane 34a is conducted from the RO unit by a concentrate line 40 to a pipe junction 41. Continuous membrane scouring is performed by a recycling line 42 which conducts a first portion of the concentrate from the RO unit back to join with make-up water from a line 43 to flow into an RO feed water line 44. Feed water line 44 is connected to the inlet or suction side of pump 36 after passing through an ultraviolet (UV) sterilizer 46, such as Glasco Model GUS-7. The UV sterilizer 46 is sized to provide a minimum of 60,000 nano seconds of 254 nanometers wave length to the combined recycled concentrate and make-up water streams. The UV sterilizer 46 is controlled with the PLC 22 to turn off when the RO is off. It is programmed to turn on two minutes prior to the supply valve AV1 opening to develop maximum operating intensity.

A second portion of the concentrate from concentrate line 40 flows through a reject line 48 to drain.

In accordance with one aspect of the present invention, a recycle valve 50 is adjustable to control the rate of flow of concentrate through recycle line 42, and a reject valve 52 is adjustable to control the rate of flow through reject line 48 to drain. The valves are selectively adjusted to provide preselected rates of flow with respect to one another and with respect to the rate of flow of permeate from permeate line 38. They are set so that the recycled concentrate flow rate in recycle line 42 significantly exceeds the permeate flow rate in permeate line 38. The adjustable valve 37 at the outlet of pump 36 also serves as a means to regulate these rates of flow.

Preferably the flow rate of concentrate in recycle line 42 is two to six times the rate of flow of permeate leaving the RO unit via permeate line 38.

The respective flow rates may be monitored by flow meters 38a, 42a and 48a. Although the system shown contemplates manual valves 37, 50, 52 to set the respective flow rates, in lines 42 and 48, fixed orifices may be substituted if the system parameters are well known.

One of the important aspects of the invention is the high velocity flow through the reverse osmosis pump 36, the RO module 34, the concentrate recycle line 42, and the RO feed water line 44 to the pump during the normal operating purification cycle. This concept keeps colloids and microorganisms in suspension thus preventing a scale or biofilm from forming within the system. This feature also allows the module to convert a higher ratio of purified water quantity to the make-up quantity. TriSep and the other module manufacturers recommend that 10 to 15 percent of the make-up water exit as product water. The higher velocity flow allows up to 85 percent of the make-up water to exit as product water per module.

The invention includes designing the reverse osmosis system on the basis of 10° C. (50° F.) temperatures for the RO feed water. It is known in the art that 25° C. (78° F.) is the design basis for rating the capacity of output (purified) water. For each degree in F cooler than 78° F. the production capacity decreases by 1.5 percent. When operating at less than the 78° F. design temperature, the rated capacity can be maintained by increasing the pressure feeding the module by adjusting the pump valve 37, the recycle valve 50 and the reject valve 52. The cooler water and higher pressure causes the membranes to reduce the amount of salt passage, which improves the quality of the purified water. Therefore the combination of cooler RO feed water, higher operating pressures with the high velocity concentration stream, allows the system to maintain an ionic purity virtually equal to a concentrated low velocity warm water system.

Turning now to the cleaning and sanitizing section 16, a chemical injection system shown generally at 54 is connected to inject a chemical into a chemical injection conduit 56 by means of an injector 58. The chemical injection conduit 56 is in fluid communication at its inlet end with the concentrate line 40 through the pipe junction 41 whenever a cleaning valve AV4 is opened. The chemical injection conduit 56 is connected to the recycling line 42 at a pipe junction 60 on the other side of recycle valve 50, so as to inject a controlled flow of chemical into the recycling line 42 and from there into the suction side of pump 36 whenever the cleaning valve AV4 is opened. AV4 is actuated by a control signal over line 57, as required by the PLC.

The chemical injection system 54 includes a built in chemical regulator to set the required rate of injection of selected cleaning and sanitizing chemicals which are approved by the RO module manufacturer. Generally these comprise combinations of approved alkali and acid solutions which are drawn from a tank in the chemical injection system by the eductor 58. An air filter 62 protects the purity of the cleaning solution, and a low level indicator 64 supplies a signal to the PLC. Examples of suitable cleaning and sanitizing chemicals are Tri-clean 210 and Tri-stat 110.

Referring now to the post-RO filtering and purified water storage section 18 on FIG. 2, the RO product water which has been purified enters section 18 through a line 66 shown in FIG. 2 after first passing through a diverting valve AV5 seen on FIG. 1. Section 18 further filters and purifies the water before it reaches the storage section 20. The equipment in section 18 is conventional and may vary according to the standards for "purified water" which the purification system 10 is maintaining. In FIG. 2 the following elements are seen. The RO product water passes through an optional mixed bed primary deionizer 68, and 0.2 micron filter 70, and is monitored by an in-line resistivity cell 74 prior to storage. If the resistivity level does not meet the set point, the alarm will be activated and the make up system will shut down. An ozone generator 76 is shown supplied with oxygen from external tank 78 and injected at 80 in order to introduce ozone gas into the stored water to achieve an 0.2–0.4 ppm ozone solution. This solution is circulated through the purified water line 94 to sanitize it.

A purified water storage tank 82 receives purified water from line 66. A level transmitter signal from transducer 84 is converted to a "percent full" display on the PLC. The storage tank 82 is constructed from an FDA approved resin, having a dished bottom and annular top, in a totally enclosed vessel. The storage system includes a 0.2 micron hydrophobic air vent filter, $CO_2$ removal filter, sanitary overflow trap and drain, analog level transmitter 84 wired to the PLC and set to provide low low storage level alarm and distribution pump shut off, a low level alarm, RO start, RO stop, and high level alarm. The storage system 20 will also include a tank mounted distribution loop back pressure control valve 86, and an appropriate fitting to connect to a distribution/recirculation loop 94. The tank includes top mounted pipe connections.

Referring now to the final loop supply section 20, a recirculation/distribution pump 88 pumps water from the purified water storage tank when directed by a control signal over line 88a connected to the PLC. Pump 88 supplies purified water over line 90 connected through a loop UV sterilizer 92 to loop supply line 94. The loop UV sterilizer 92 has 316 stainless steel wetted materials, 254 nanometer wavelength lamp(s) and a running time meter. An intensity meter and audible alarm are also included. The UV sterilizer 92 is arranged to automatically turn on when the recirculation pump 88 is started. A suitable UV sterilizer 92 is Glasco Model G50. Lastly, a 0.2-micron filter 96 insures water purity.

Before and after the chemical injection cycle, the system is purged and flushed by the following means according to the present invention First, a source of purified water to purge the system is obtained from a purge conduit 98 having its inlet connected to loop supply line 94 (FIG. 2) and having its outlet connected to pump suction line 44 (FIG. 1). An automatically controlled purge valve AV2 is interposed in line 98 and controlled by signals over line 97 connected to the PLC. When AV2 is opened by the PLC, a flow of purified water from the loop supply line 94 is introduced through conduit 99 to the inlet of RO pump 36 and pumped through the concentrate side of RO unit 34. AV1 is closed by the PLC by signals over line 33 when AV2 is open.

In order to remove cleaning solution or other contaminants, a flush conduit 100 is connected between pipe junction 41 and drain in parallel with the reject line 48. The flush conduit 100 dumps concentrate from the concentrate line 40 to drain when automatically controlled flush valve AV3 opens, as controlled by a signal on line 101 connected to the PLC. The flush rate of flow is controlled by a manual valve 102 set, for example, at 2–4 gallons per minute. During the fast flush operation of the purge cycle, the panel mounted flow meter 48a records a normal reject flow together with the fast flush flow.

It remains to note that there are a number of other safety and measurement devices necessary to the overall purification system 10, which are not relevant to the present invention. For example, a conductivity cell 104 in the loop supply line is compared to the measurement of conductivity cell 74 in a Myron-L meter 106. Similarly, a conductivity cell 107 in the RO pump inlet line and a conductivity cell 108 in the permeate line are compared in a meter 110 and the output fed to the PLC.

The programmable logic controller (PLC) may take several forms. The design is conventional and it is within the scope of one skilled in the art to program the controller to respond to the various signals and operate the automatic valves and the pumps. A suitable PLC incorporates by a programmable microprocessor, and includes a back lit display screen and user interface key pad. The display screen shows the operational status of the entire system including alarms. The following are displayed: make-up water temperature, make-up water conductivity, product water temperature, product water conductivity, and percentage of rejection. It also displays automatic mode or manual mode, storage tank water level, RO on, low make-up pressure, storage tank low level, distribution pump on/off (low low level), low cleaning/sanitizing chemical level, sanitizing mode, inlet valve AV1 open, fast flush valve AV3 open, and RO system purge with purified water valve AV2 open. The operator interface shall allow the operator to silence the audible alarm, and reset the system after an alarm fault is corrected. Selecting the manual mode allows the RO and, or the distribution pump to be started or stopped. Selecting the automatic mode allows the system to operate unattended.

OPERATION

Figure 4:
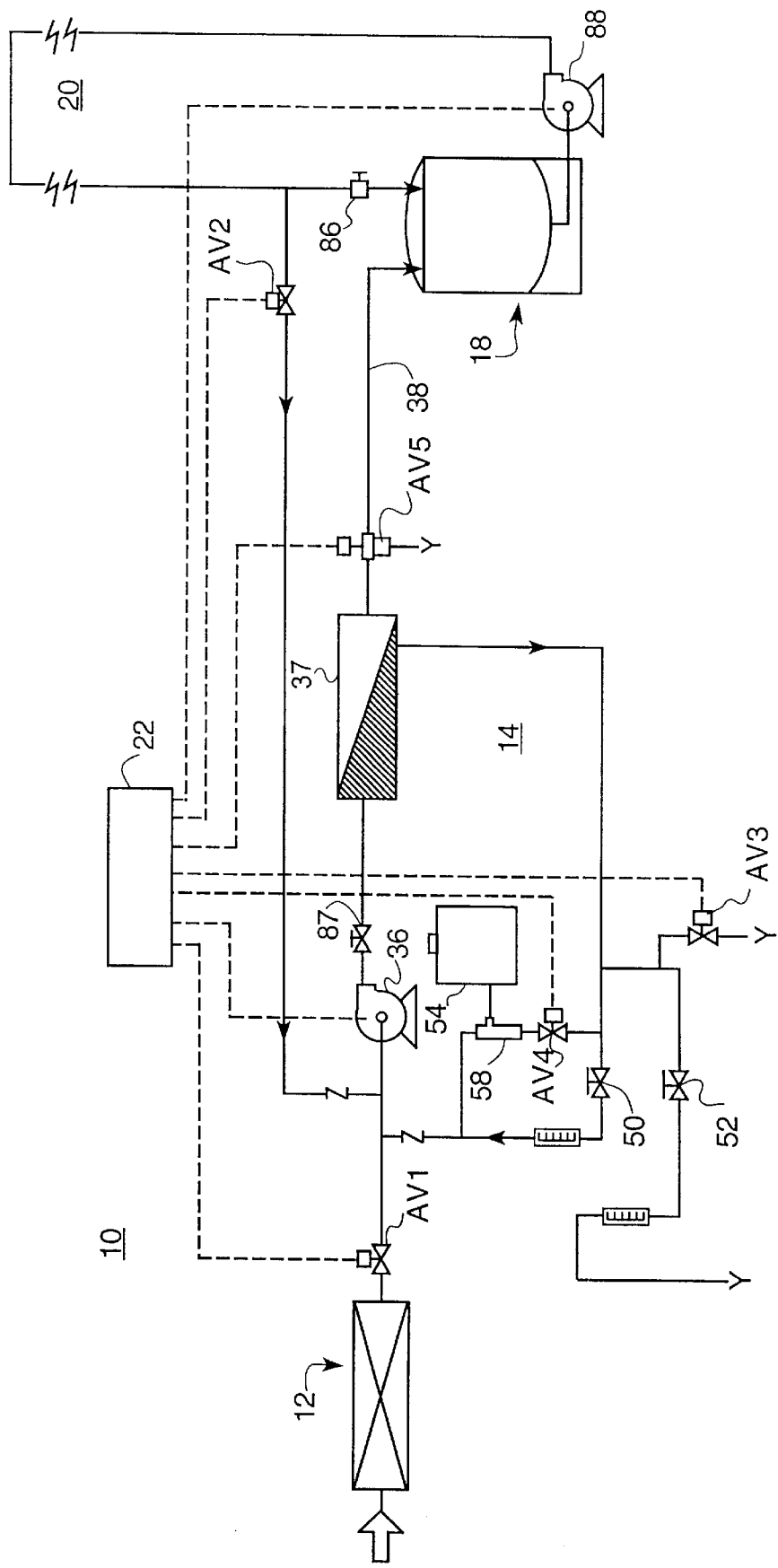
FIG. 4 is a simplified schematic drawing illustrating the operation of the invention.

The operation of the invention will be better understood by reference to FIG. 4 which is a simplified diagram eliminating elements of the water purification system which are unnecessary to an understanding of the invention. The reference numbers are the same as those in FIGS. 1 and 2.

PLC 22 controls the normal purification cycle as well as the purge cycle and the chemical injection cycle. During the normal (purification) cycle, valve AV1 is open and prepared make-up water is pumped by pump 36 to the RO unit 34 where permeate is directed to the storage section 18 through diverting valve AV5. Recirculation/distribution pump 88 is operated by the PLC 22 to continuously recirculate a supply of the purified water. During the purification cycle, concentrate flows through recycle valve 50 and through reject valve 52 in preselected flow ratios. Valves AV2, AV3 and AV4 are closed. During the purification cycle, the RO module is continuously scoured by a high velocity recirculating process to decrease sedimentation and resulting scale from precipitating on the reverse osmosis membranes, while the diverter valve AV5 with sensors protects the water purity.

Diverter valve AV5 directs the product water to divert to a waste drain if it is below the design purity. The purified water is continuously monitored with a well known type of conductivity cell and monitor that activates and deactivates the purified water diverter valve AV5. If the purity fails to meet the design level the system will alert an audible alarm and automatically shut down to prevent the purified water in the storage system from becoming contaminated.

During the purge cycle the valves are automatically controlled to purge the concentrated debris and bacteria from the entire reverse osmosis system (i.e., pump, piping, modules, and valves) before shut down cycles, using purified and ultraviolet treated water during a purge cycle of the system. During the purge cycle, inlet valve AV1 is closed. Purge valve AV2 opens to supply purified water from the supply loop 20, and fast flush valve AV3 opens to dump concentrate to the drain.

During the daily sanitizing/cleaning mode, after the purge cycle, a chemical injection cycle commences. Valve AV4 is opened to introduce chemical from the chemical injection system 54 into the concentrate recycle loop, which is supplied with purified water. After a preselected time valve AV4 closes and a chemical soak period takes place.

An important benefit and feature of the operational cycle is the purified water purge. This cycle occurs each time the storage tank level is satisfied and the RO is preparing to turn off. One purpose is to "flood" the system with "aggressive" purified, ultraviolet sterilized water and scour the membranes surface. The flush valve is opened to allow the impurities to rinse out of the system. During the "off" mode the purified water soaks the system to loosen biofilm and scale. When the system starts, the flush valve and divert valve divert the concentrate stream and permeate water to waste.

The PLC automatically introduces the cleaning chemical and it cleans the entire reverse osmosis system unattended during a chemical injection cycle of the system and also automatically introduces a sanitizing agent and sanitizes the entire reverse osmosis system during the chemical injection cycle.

While there has been described what is considered to be the preferred embodiment of the invention, other modifications will occur to those skilled in the art and it is desired to secure in the appended claims all such modifications as fall within the true spirit and scope of the invention.

We claim:

1. In a water purification system including a reverse osmosis (RO) unit having at least one RO membrane, a source of prepared make-up water which has been prepared by filtering and dechlorinating, a make-up water supply conduit connected to the make-up water source, a pump having an inlet side connected to the make-up water supply conduit and an outlet side connected to a feed side of the RO membrane, a permeate line connected to a permeate side of the RO membrane for conducting purified water from the RO unit, a storage system connected to receive purified water from the permeate line, a concentrate line connected to the feed side of the RO membrane for conducting concentrate from the RO unit, a recycling line connected to supply a portion of concentrate from the condensate line to join with water from the source of make-up water at the inlet side of the pump, and a reject line connected to conduct another portion of the concentrate from the concentrate line to drain, the improvement comprising:

means regulating the flow rate through the recycling line relative to the flow rate through the reject line such that the recycled concentrate flow rate significantly exceeds the permeate flow rate so as to scour the semipermeable membrane with a high velocity flow of concentrate during a purification cycle, a chemical injection system including a chemical injection conduit for conducting concentrate from the concentrate line to the inlet side of the pump separately from the portion recycled through the recycling line, a source of chemical for cleaning the membrane and an injector connected to inject a controlled flow of chemical into the chemical injection conduit during a chemical injection cycle, a purge conduit connected to supply purified water from the storage system to the inlet side of the pump during a purge cycle and during said chemical injection cycle, a flush conduit connected to dump concentrate from the concentrate line to drain during said purge cycle and during said chemical injection cycle, a plurality of automatically controllable valves arranged to selectively control the flow through said conduits, and a programmable logic controller connected to selectively control said automatically controllable valves to provide at least the purification cycle, the purge cycle, and the chemical injection cycle.

2. The system according to claim 1, wherein said regulating means comprises a first flow control valve in the recycling line and a second flow control valve in the reject line, said first and second flow control valves being set to maintain a flow rate of concentrate in the concentrate line which is two to six times the flow rate in the permeate line during the purification cycle.

3. The system according to claim 1, wherein the automatically controllable valves include a purge valve in the purge conduit and a flush valve in the flush conduit, together with a program in the programmable logic controller arranged to open said purge valve and said flush valve, and to close an inlet valve in the supply conduit, during a purge cycle.

4. The system according to claim 1, wherein the automatically controlled valves include a cleaning valve in the chemical injection conduit, together with a program in the programmable logic controller to open the cleaning valve and to close an inlet valve in the supply conduit and a flush valve in the flush conduit during a chemical injection cycle.

5. The system according to claim 1, wherein said regulating means is set so that the flow of purified water into the permeate line is approximately 85 percent of the flow of prepared make-up water into the water purification system.

6. A water purification system, comprising:

a filtration unit having a membrane separating a concentrate side from a permeate side, the concentrate side of the filtration unit being configured to receive water from a water supply line and to discharge water not passed through the membrane via a concentrate line, and the permeate side of the filtration unit being configured to discharge water that has passed through the membrane via a permeate line;

a recycle line hydraulically connected between the concentrate line and the water supply line;

a recycle valve in the recycle line configured to adjust a flow rate of water through the recycle line;

a reject line hydraulically connected between the concentrate line and a drain line; and a reject valve in the reject line configured to adjust a flow rate of water through the reject line;

a control operatively connected to the recycle valve and the reject valve, and configured to regulate the flow rates such that the flow rate of water through the recycle line significantly exceeds a permeate flow rate in the permeate line so as to scour the membrane with a high velocity flow of concentrate during a purification cycle; and a chemical injection system comprising a chemical injection conduit for conducting concentrate from the concentrate line to the water supply line, bypassing the recycle valve, and a chemical injector configured to inject chemical into said chemical injection conduit.

7. The water purification system of claim 6, further comprising a make-up water purification system interposed between the water supply line and filtration unit.

8. The water purification system of claim 7, wherein the make-up water purification system comprises a deep bed filter, a resin softener, a brine tank, and a carbon filter.

9. The water purification system of claim 6, further comprising:

a water supply valve interposed between the water supply line and the filtration unit; and a water supply pump interposed between the water supply valve and the filtration unit.

10. The water purification system of claim 9, wherein the chemical injection system is in hydraulic communication with the water supply line between the water supply valve and the filtration unit.

11. The water purification system of claim 10, wherein the chemical injection system is in hydraulic communication with the water supply line between the water supply valve and the water supply pump.

12. The water purification system of claim 9, wherein the recycle line is hydraulically connected to the water supply line between the water supply valve and the filtration unit.

13. The water purification system of claim 9, wherein the chemical injection system comprises:

a cleaning valve disposed in the chemical injection conduit configured to regulate flow of water in the chemical injection conduit;

a chemical source controllably connected to the chemical injection conduit; and wherein the control is configured to control the recycle valve and the cleaning valve, during a cleaning cycle, such that at least a portion of the concentrate flows through the cleaning valve during a cleaning cycle.

14. The water purification system of claim 6, further comprising a diverting valve, hydraulically connected to the permeate line, configured to divert permeate from a purified water storage.

15. The water purification system of claim 6, further comprising an ozone generator connected to the permeate line.

16. The water purification system of claim 6, further comprising a recirculation/distribution pump hydraulically connected to the permeate line.

17. The water purification system of claim 6, further comprising a loop UV sterilizer connected to the permeate line.

18. The water purification system of claim 6, further comprising a purge conduit hydraulically connected to the permeate line and configured to reintroduce permeate to the filtration unit at least during a purge cycle of the water purification system.

19. The water purification system of claim 6, wherein the control comprises a programmable logic controller containing software configured to control at least one of the recycle valve and the reject valve.

* * * * *